United States Patent [19]

Lichter et al.

[11] 4,307,200
[45] * Dec. 22, 1981

[54] COMPOSITE FOAMED MATERIAL

[76] Inventors: Seymour Lichter, 137 Fairway Dr.; Frank P. Nold, Rte. 2, Box 60, both of New Castle, Ind. 47362

[*] Notice: The portion of the term of this patent subsequent to Dec. 23, 1997, has been disclaimed.

[21] Appl. No.: 228,259

[22] Filed: Jan. 26, 1981

[51] Int. Cl.³ .............................................. C08J 9/22
[52] U.S. Cl. .................................... 521/54; 264/109; 264/122; 264/DIG. 7; 521/59; 521/137; 521/139
[58] Field of Search ..................... 521/54, 137, 139; 264/DIG. 7, 45.4, 109, 122

[56] References Cited

U.S. PATENT DOCUMENTS 4,240,998 12/1980 Lichter et al. ........................ 521/70
4,241,190 12/1980 Lichter et al. ........................ 521/54

Primary Examiner—Morton Foelak
Attorney, Agent, or Firm—Woodard, Weikart, Emhardt & Naughton

[57] ABSTRACT

A composite foamed material and a process for the production thereof are disclosed herein, the process comprising premixing expandable or expanded polystyrene beads, a binder and fragments of resilient, open-celled neoprene. The materials are combined in the proportions of about 4–15% polystyrene beads, about 6–25% binder and about 60–90% open-celled neoprene. The combined materials are preferably compressed to a density of about 5–30 lbs. per cubic foot, more preferably 5–17 lbs. per cubic foot, and steam is applied to the compressed materials to cure the binder, and in certain embodiments to expand the polystyrene beads, thereby producing the desired composite foamed material.

10 Claims, 1 Drawing Figure

COMPOSITE FOAMED MATERIAL

BACKGROUND OF THE INVENTION

1. Field of the Invention

The present invention relates to resilient cellular materials and more particularly to a composite foamed material.

2. Description of the Prior Art

A variety of cellular, and particularly foamed, materials are well known in the prior art. Procedures for the production of such materials have correspondingly been known in the art, as well as procedures for producing composite materials which include foamed or cellular materials. It is recognized that the advantage of a composite material is that it typically displays physical properties which differ from the individual components of the material. Further, the composite may be less expensive than an isolated material due to the inclusion of relatively inexpensive fillers. The present invention provides a composite foamed material, and a process for the production thereof, having particularly advantageous physical characteristics for certain applications.

In U.S. Pat. No. 3,300,421, issued to Merriman et al. on Jan. 24, 1967, there is disclosed a process for the production of "bonded resilient fragment" materials. The Merriam et al. patent discloses a process in which substantially rigid, pre-expanded glass or synthetic resin particles are combined with resilient cellular material and a bonding agent. The cellular material is selected from natural rubber, synthetic rubber and polyurethane. The resultant mix is compressed while substantial bonding occurs. The material produced by the process of the Merriman et al. patent is particularly adapted for certain applications. A cushioning material comprising a mixture of shredded pneumacel batting and shredded particles of polyurethane or rubber bonded together by an elastomeric binder is disclosed in U.S. Pat. No. 3,894,973, issued to Yunan on July 15, 1975.

Generally, both of these patents and the other references fail to appreciate the significant finding of the present invention that a composite of neoprene and polystyrene does not display substantial increase in flammability or smoking over simply the neoprene material. These and all other references also fail to recognize that the minimal increase in these characteristics is obtained while at the same time advantageous physical properties, particularly impact absorption, are achieved with a product which is less expensive than a pure neoprene material. Typical prior art for certain applications uses pure neoprene, while the present invention provides a composite material which is less expensive, displays greatly improved impact absorption properties, and does not exceed desired flame and smoke limitations.

In a particular aspect, the Merriman et al. procedure employs already expanded polystyrene granules, which granules are therefore uniform in shape. In contrast, the present invention includes in one embodiment the expansion of polystyrene beads while under compression and while in combination with resilient cellular neoprene, and this produces irregularly-shaped, expanded beads. It has been found that, as a result of this expansion of the polystyrene beads while commingled with the cellular material, a more intimate relationship between the two components is achieved. For example, it has been observed that closely spaced polystyrene beads, when expanded in the preferred embodiment in proximity with the existent cellular material, will trap portions of the cellular material therebetween, which would not result by the process of the Merriman et al. patent. In addition, the compression of the material in accordance with the Merriman et al. patent tends to crush the pre-expanded polystyrene beads, whereas the expansion of the beads after the step of compression and in the presence of the existant cellular material will tend not to produce "crushed" beads, but only to cause the beads to expand in irregular fashion.

A number of other composite foamed materials have been proposed in the prior art. In U.S. Pat. No. 3,607,797, issued to Rubens et al. on September 21, 1979, there is disclosed a composite foam having copolymer particles dispersed throughout a urethane foam matrix. The composite foam of the Rubens et al. patent is prepared by combining expandable copolymer beads with a polyurethane foam precursor, and thereafter allowing the mixture to foam. Similar materials having thermoplastic beads which are expanded with the surrounding and primarily supporting foam material are disclosed in U.S. Pat. Nos. 3,878,133, issued to Rubens on Apr. 15, 1975, and 2,958,905, issued to Newberg et al. on Nov. 8, 1960. In U.S. Pat. No. 3,503,840, issued to Parrish on Mar. 31, 1970, there is disclosed a composite material having closed-cell reinforcing particles supported within a surrounding foam matrix, the closed-cell particles not being expanded with the foam matrix.

Einhorn et al. disclosed in U.S. Pat. No. 3,114,722, issued on Dec. 17, 1963, a composite material comprising shredded cellular material bonded together by a prepolymer binder. Procedures for the production of foamed materials in which polystyrene beads are held together with a binder are disclosed in U.S. Pat. Nos. 3,585,157, issued to Beck on June 15, 1971, and 2,959,508, issued to Graham et al. on Nov. 8, 1960. Additional references in this art include the following: U.S. Pat. Nos. 3,855,049, issued to Klein on Dec. 17, 1974; 3,251,916, issued to Newnham et al. on May 17, 1966; 2,892,216, issued to Steel on June 30, 1959; and 2,878,153, issued to Hacklander on Mar. 17, 1959, as well as Great Britain Pat. Nos. 1,033,702 issued to Oak and 889,278 issued to Taylor.

In none of these references is there described the expansion of the polystyrene beads in situ with open celled material and binder maintained under pressure. More generally, the present invention achieves a product in another aspect which incorporates polystyrene material but which surprisingly does not have the disadvantageous smoking and flammability characteristic of polystyrene.

SUMMARY OF THE INVENTION

In one aspect of the present invention there is provided a composite foamed material, which comprises about 60-90% neoprene, about 4-15% polystyrene beads, and about 6-25% binder. Another aspect of the present invention provides a composite foamed material comprising the previously mentioned materials in combination, the polystyrene beads being expanded separately or in situ.

It is an object of the present invention to provide a composite foamed material which is readily produced and is uniform in composition.

Another object of the present invention is to provide a composite foamed material having novel and advantageous physical characteristics for particular applications, particularly having minimal smoke and flame properties.

It is a further object of the present invention to provide a composite foamed material which may be produced by the utilization of relatively simple and readily available blending and proportioning equipment.

Another object of the present invention is to provide a novel composite foamed material having advantageous and uniform physical properties.

Further objects and advantages of the present invention will become apparent from the description of the preferred embodiment which follows.

BRIEF DESCRIPTION OF THE DRAWING

The FIGURE is a perspective view of a container useful as a mold in conjuction with the present invention.

DESCRIPTION OF THE PREFERRED EMBODIMENT

Figure 1:
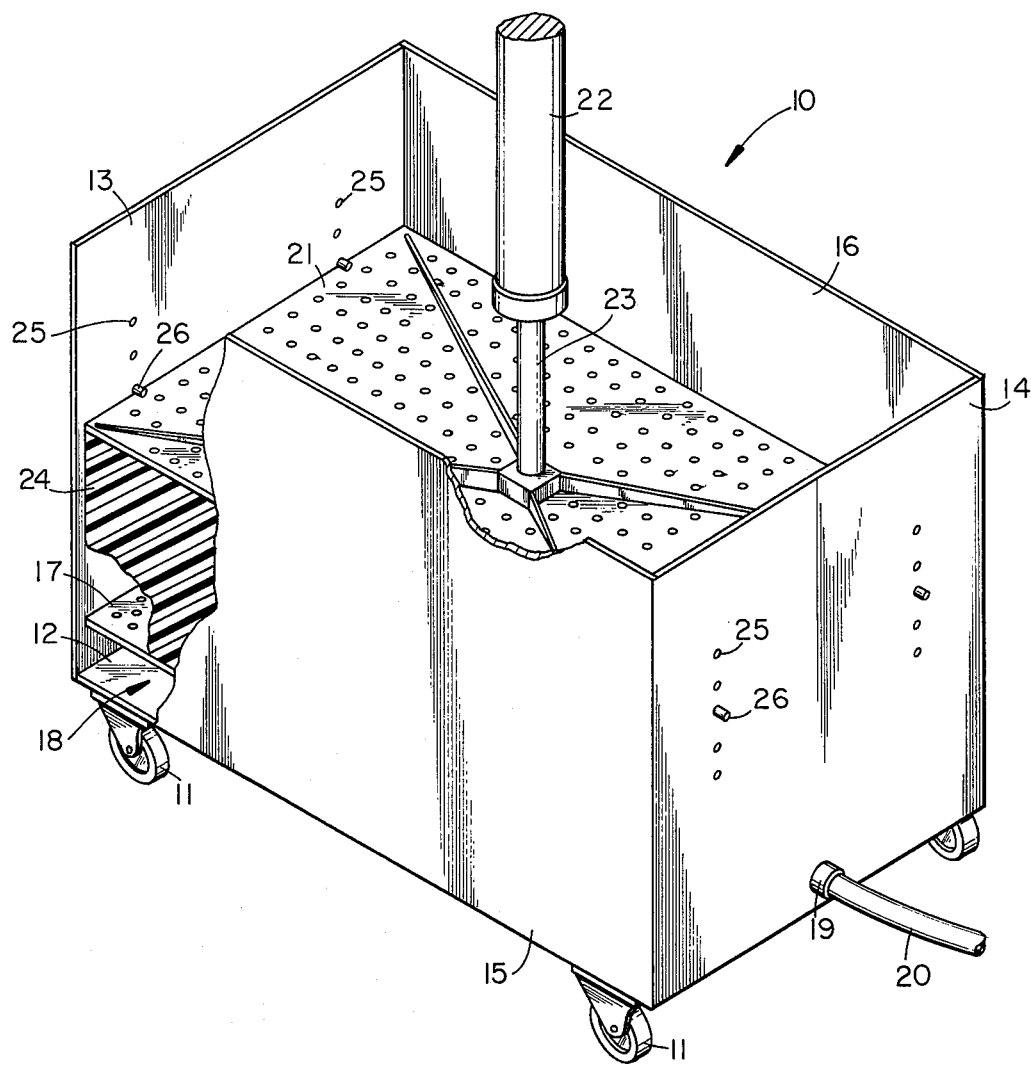

A number of isolated and/or composite foamed materials are known in the prior art, together with the various processes for the production thereof. The present invention provides a simple and readily performed process for the production of a novel, composite foamed material having particularly advantageous physical properties for certain applications. The composite foamed material of the present invention is easily produced by the described process, and is particularly useful as a cushioning or padding material, particularly for impact absorption.

In accordance with the process of the present invention, polystyrene beads, a binder, and resilient open-celled neoprene are combined together in a mix. The constituents may be combined in typical fashion with available mixing devices. It has been found, however, that the polystyrene beads and the binder, or alternatively the neoprene and the binder, are preferably premixed and subsequently combined with the other material.

The purpose for premixing these ingredients is that it is desirable to obtain a thorough and even distribution of the polystyrene beads with the open-celled neoprene. It will be appreciated to one skilled in the art that a dispersion of the polystyrene beads in the open-celled neoprene alone is not obtainable since the polystyrene beads tend simply to fall to the bottom of the mixing container, thus effectively separating from the open-celled neoprene. Addition of the binder at that point would effectively retain the separation to at least some degree. It has been discovered that by premixing the binder with the polystyrene beads, a subsequent mixing with the fragmented, open-celled neoprene will produce a uniform product since the polystyrene beads have been evenly distributed within the binder. The binder and associated beads become evenly distributed throughout the fragmented, open-celled neoprene. Alternatively, the beads may be added to a premix of the neoprene and binder also with suitable results.

Essentially any of the commercially-available, expandable or expanded polystyrene beads may be utilized in the process of the present invention. Polystyrene beads are generally available as unexpanded, or as partially or fully expanded. The present invention encompasses the utilization of fully pre-expanded polystyrene beads, as well as unexpanded or partially pre-expanded polystyrene beads to the extent that such beads would be further expandable. In the preferred embodiment described below, the polystyrene beads are expanded in situ with the binder and neoprene held under pressure. It is to be understood, however, that the novel and unexpected feature of desirably low smoke and flame properties may be obtained with the expansion of the polystyrene beads either separately or in situ but without pressure, and these embodiments are also intended to be covered hereby.

Expandable polystyrene beads are well known in the art. Such beads typically comprise the polystyrene itself together with a blowing agent comprising a volatile liquid such as a mixture of pentanes. The pre-expanded polystyrene beads utilized in the present invention preferably have a maximum diameter of about 0.1 mm. A particular type of polystyrene bead found to be useful in the present invention is that marketed under the trademark Fostofoam by the Foster Grant Co., Inc., Leominster, Massachusetts. The Fostofoam polystyrene beads are typical and comprise 92-93% styrene and 6-7% blowing agent. Other expandable polystyrene bead compositions are well known, and would be equally suitable for use in the present invention.

The expandable polystyrene beads are preferably premixed with a suitable binder for subsequent addition to the fragmented, open-celled neoprene. A substantial variety of suitable binders, also known in the art as bonding agents, are well known and equally useful in the present invention. Appropriate binders would include, for example, liquid polyurethane-forming compositions, effecting the bonding by a single-stage reaction or by an intermediate prepolymer reaction product. Other examples are the compositions based on liquid organic polysulfides together with epoxy resins. The suitability of various known binders would be readily apparent to one skilled in the art, or would be easily determined by experimentation. It will be appreciated that the binder, upon curing or setting, should securely bond together the fragmented open-celled neoprene and the expanded polystyrene beads, while permitting the resulting material to be flexible.

A particular binder found to be useful in accordance with the present invention is that marketed under the trademark Mistabond 324-S by M-R Plastics & Coatings, Inc., Maryland Heights, Missouri. The Mistabond 324-S is a urethane prepolymer binder which is a clear, amber liquid comprising less than 10% methylene chloride and less than 15% toluene diisocyanate. Mistabond 324-S has a low viscosity and a high flashpoint, and displays excellent wetting characteristics. As will be further described, the preferred process of the present invention utilizes the application of steam for curing or accelerating the binder and for expanding the polystyrene beads, and it is therefore preferable that the binder employed be steam-curable, although other binders such as water-accelerated binders will work equally well with appropriate modifications to the preferred process. It has also been noted that advantageous smoke and flame properties are achieved by the present invention, and the binder should therefore also be fire retardant.

The polystyrene beads and the binder, preferably after premixing of the two, are added to fragments of resilient, open-celled neoprene. The open-celled neoprene has been found to provide the desired smoke and flame properties in combination with the polystyrene beads. More particularly, it has surprisingly been found that the composite material including neoprene and polystyrene does not have substantially increased flame or smoke properties over the neoprene alone. A typical use for products of the present invention is in school bus padding. Prior art products in such applications have included, for example, solely neoprene in order to meet applicable state and/or federal specifications for such materials and even then these products have not been satisfactory or have failed to meet the specifications. Applicant has discovered that a composite product as described herein utilizing the expensive neoprene in combination with relatively inexpensive polystyrene beads meets the applicable standards. It is desired that the neoprene be open-celled since closed-celled materials are too resilient to provide an advantageous composite foamed material in accordance with the present invention.

The constituents are combined in preselected proportions and the resultant mix is subsequently treated to yield the composite foamed material of the present invention. The weight percentage of each of the constituents in the final mix is from about 4% to about 15% of polystyrene beads, from about 6% to about 25% of the binder, and from about 60% to about 90% of the fragments of resilient, open-celled neoprene. In a most preferred embodiment of the present invention, the constituents are combined in the proportions of about 7.5% of polystyrene beads, about 12.5% of binder, and about 80% of resilient, open-celled neoprene. It has been found to be preferable to include the binder in an amount which is about 10% of the amount of the fragments of resilient, open-celled neoprene in order to obtain proper and adequate binding of the fragments in the resulting composite foamed material.

The materials are combined in the proportions recited above and they are briefly mixed with appropriate equipment to insure a thorough distribution of the polystyrene beads and binder in relation to the resilient, open-celled neoprene. It will be appreciated that the resulting mixture initially in a fluffy mass. The mix is then transferred to a container, such as container 10 in the FIGURE, for further processing. In accordance with the preferred embodiment of the process of the present invention, the mix of constituents is compressed within a mold to a density of from about 5 to about 30 lbs/ft$^3$, preferably 5–17 lbs/ft$^3$ and most preferably from about 7 to about 12 lbs/ft$^3$. The mix is compressed within a mold, such as container 10, and then held in compression during the expansion of the polystyrene beads and curing of the binder. Alternatively, the expansion of the beads is performed separate of the other materials or in situ but without pressure.

Container 10 comprises a cart having a floor 12, end walls 13 and 14, and side walls 15 and 16. As will be further described below, side walls 15 and 16 are hingedly mounted along their lower edges to floor 12, and are held in their initial, upright position by latches (not shown) securing them to the end walls. Caster wheels 11 are mounted to the underside of floor 12 to facilitate movement of the container 10 for handling purposes. A perforate plate 17 is mounted within container 10 and above floor 12. A chamber 18 is defined by the volume surrounded by floor 12, plate 17 and the side and end walls of container 10. The constituent mix is supported upon plate 17 during mixing, the perforations in the plate 17 being sufficiently small to prevent a significant amount of material from passing downwardly through the plate.

When the constituent mix has been sufficiently blended in a suitable blending apparatus to obtain uniform distribution of the materials, the container 10 is filled with a desired weight of material and thereafter positioned to receive a second perforate plate 21. Plate 21 is secured to a piston rod 23 which is received within a hydraulic cylinder 22. Cylinder 22 is mounted appropriately to a surrounding structure, such as to the ceiling of a room, so that it may operate to apply a downward, hydraulic pressure through piston rod 23 to plate 21. With container 10 positioned to receive plate 21, the plate is moved downwardly through the cooperation of hydraulic cylinder 22 and piston rod 23 to compress the mix in the container to the desired extent.

It has been found particularly convenient to utilize pins 26 received in holes 25 in the endwalls of container 10 to regulate the final volume of the composite foamed material produced in accordance with the present invention. In accordance with this technique, a known amount of the constituent mix is compressed to a certain extent, and the pins 26 are inserted in preselected ones of the holes 25. The plate 21 is then permitted to rise until it engages the pins 26, which pins then hold the plate in position during curing of the composite foamed material. By appropriate positioning of the pins 26 in the holes 25, the volume and therefore the density of the composite foamed material may be predetermined. As previously indicated, the mix is compressed to a density of from about 5 to about 30 lbs/ft$^3$, preferably 5–17 lbs/ft$^3$ and most preferably from about 7 to about 9 lbs/ft$^3$. In the latter instance, for the typical materials utilized in the present invention the initial mix is compressed to about 55% of its uncompressed volume.

With the mix held in compression in the preferred embodiment, the polystyrene beads are expanded and the binder is cured. These steps may both be accomplished very readily by the application of steam to the container 10. Coupling 19 connects steam line 20 to container 10 at a location to be in communication with chamber 18. Line 20 is connected at its other end to a suitable source of steam. With the mix being held in compression between plates 17 and 21, steam is introduced through line 20 and into chamber 18. The steam passes upwardly through the constituent mix until it escapes through the perforations in plate 21. An insignificant amount of steam is lost through the holes 25 located below plate 21. By the passage of the steam through the mix, the binder is heated sufficiently to produce curing, and at the same time the polystyrene beads are heated sufficiently to cause expansion. Steam curing in this manner for a period of 2–5 minutes will generally produce sufficient polystyrene bead expansion and binder curing to permit removal of the composite foamed material, known as a bun. It has been found that typically the curing should be conducted for a limited time period, perhaps not more than 3-4 minutes, to avoid deterioration or collapse of the expanded polystyrene beads. The temperature of the curing steam must be sufficiently low to avoid collapsing the beads. It has also been discovered that in performing the described process with a container 10, the described container is preferably made from metal due to the high heat conductivity of the metal and the consequent avoidance of channeling of the steam due to localized cooling of the steam. The container should also be preheated to avoid uneven heat distribution due to the otherwise relatively cool container walls.

The binder is cured while the constituent mix is maintained under compression. As is well known in the art, the binder may be cured to a substantial extent while the material is in the mold, with further, final curing of the binder typically occurring after removal of the bun from the mold. It is of course preferable to provide for the binder curing, while the material is in the mold, to an extent sufficient to cause the material to essentially retain its molded form and size. This may be accomplished by partial or full curing of the binder while in the mold, with partial curing being preferred since it is sufficient and it reduces the period of time required for the bun to be retained in the mold. Typically there is at least a slight expansion of the bun upon extraction from the mold as is to be expected. For the purposes herein, the term curing is used to mean curing of the binder at least to the extent sufficient to cause the bun to substantially retain its molded size and shape upon removal from the mold.

Upon sufficient curing of the binder and expansion of the beads, the composite foamed material is released from container 10. This is accomplished by raising plate 21 and pivoting side walls 15 and 16 away from the material, the side walls being hingedly mounted (not shown) along their bottom edge to floor 12. The composite foamed material is thereby made accessible and may be extracted from the container 10.

The following examples of the process and product of the present invention are given to further detail and exemplify the present invention, and are not intended to limit the invention herein disclosed and claimed.

EXAMPLE 1

A composite foamed material was prepared in accordance with the method of the present invention. To 25 lbs of the binder Mistabond 324-S was added 15 lbs of Fostofoam polystyrene beads. The binder and beads were thoroughly mixed and then added to 160 lbs of shredded neoprene foam, representing weight percentages of the constituents to the final material of 12.5% binder, 7.5% beads and 80% neoprene foam. Alternatively, the neoprene and binder were blended together first for about one minute, and the beads were then added and the mixture blended about two minutes.

The materials were mixed well and then placed under compression in a container as shown in FIG. 1. The container was dimensioned approximately 72 in×38 in×14 in with the second perforate plate lowered to compress the mix, equivalent to a volume of about 22.2 ft$^3$ and a density for the 200 lbs of material of about 9 lbs/ft$^3$. Steam was introduced through the container for about 3 minutes to expand the beads and accelerate or cure the binder. The resultant bun was removed from the container after cooling about 30 minutes and yielded a composite foamed material displaying excellent impact absorption, flame and smoke characteristics.

EXAMPLE 2

The procedure of Example 1 was followed except that the materials were added in the proportions of 25 lbs of binder (9.6%), 30 lbs of beads (11.4%), and 207 lbs of scrap foam (79%). The resultant composite foamed material displayed excellent physical properties.

EXAMPLES 3–8

The procedure of Example 1 was followed except the amount of binder was changed in one procedure to 50 lbs and in another to 12.5 lbs. In two additional procedures the method of Example 1 was followed except the amount of beads in one instance was 30 lbs and in the other was 7.5 lbs. The procedure of Example 1 was also repeated exactly except for changing the amount of neoprene in one instance to 60 lbs and in another instance to 360 lbs. Each of the resultant materials displayed good physical characteristics.

EXAMPLES 9–11

The procedure of Example 1 was followed except the materials were compressed, in four different procedures, to about 5, 7, 17 and 30 lbs/ft$^3$. Materials showing good physical properties were produced, although the materials in the density range of 7–9 lbs/ft$^3$ displayed the best physical characteristics with respect to impact absorption. These physical properties of the material are readily and accurately ascertainable by standardized test procedures, and the suitability of the material for various applications may thereby be determined.

EXAMPLES 12–13

The procedure of Example 1 was followed except that the polystyrene beads were pre-expanded separately or in situ and the binder was then cured with the indicated, applied pressure. Materials of good physical properties were produced.

EXAMPLES 14–16

Specifications currently exist in California relating to the non-burning qualities for seat cushions. The federal government and potentially other states are nearing the adoption of similar regulations. Materials produced as described herein were therefore tested under existing smoke and flame test procedures.

A flammability test described under ASTM Standard E 162-75 was performed. This test uses a 12 in. by 18 in. radiant heat source panel in front of which is placed a 6 in. by 18 in. specimen. The specimen is inclined at 30° with ignition forced to occur near the upper edge and the flame front progressing downward. The 1 inch thick specimen is prepared by predrying it at 140° F. for 24 hours and then equilibrating it at 73° F. and 50% relative humidity. The material in four separate tests had flame spread indexes, which is a combined measure of the rate of progress of the flame front and the rate of heat liberation from the material, of 7. By comparison, the flame spread index for a commercial neoprene product sold under the trade name Koylon was measured as between 3.5 and 5.6. In a related test, the material of the present invention was compared with the same product except without the polystyrene beads. It was found that the flame spread index increased only from 5.4 to 5.9 when the polystyrene beads were present.

A smoke density test was also conducted in conformance with NFPA Standard 258-76. This test measures the smoke generated by a 3 in.×33 in. specimen exposed to a radiant energy source under flaming and non-flaming conditions. The specimen was prepared as for the flammability test and the results showed a smoke generation average of 506 for the flaming mode tests and of 575.7 for the non-flaming mode tests.

Impact absorption tests were also conducted on the composite material. It is an advantage of this material that desired impact properties are achieved by the presence of the polystyrene beads. Standard tests for bus padding were conducted by impacting samples with an object of predetermined and standardized configuration and weight, at a speed of 16.1 feet per second. Typical resisting forces were measured in the range of 27.62 pounds to 48.00 pounds, acceptable values under applicable use standards.

What is claimed is:

1. A flame-resistant composite foamed material comprising:
   a. fragments of resilient, open-celled neoprene;
   b. expanded polystyrene beads dispersed among said fragments of open-celled neoprene; and
   c. a binder securing together said fragments of open-celled neoprene and said beads,
   said open-celled neoprene, beads and binder being present in amounts of about 60% to about 90% of the open-celled neoprene, about 4% to about 15% of the beads, and about 6% to about 25% of the binder, said composite foamed material having a density of from about 5 to about 30 lbs/ft$^3$.

2. The material of claim 1 and having a density of from about 5 to about 17 lbs/ft$^3$.

3. The material of claim 1 and comprising about 80% of the resilient, open-celled neoprene, about 7.5% of the polystyrene beads and about 12.5% of the binder.

4. The material of claim 1 in which the amount of the binder is about 15% of the amount of said resilient, open-celled neoprene.

5. The material of claim 1 in which said beads are expanded in situ while said open-celled neoprene and said beads dispersed therein are held under compression.

6. The material of claim 5 in which the amount of the binder is about 15% of the amount of said resilient, open-celled neoprene.

7. The material of claim 5 in which the polystyrene beads have a maximum diameter of about 0.1 mm prior to expansion.

8. The material of claim 5 in which said beads were expanded in situ and said binder was cured to provide securement together of said fragments of open-celled neoprene and said beads by the passage of steam through a mixture of said open-celled neoprene, unexpanded beads and binder.

9. The material of claim 8 and having a density of from about 5 to about 17 lbs/ft$^3$.

10. The material of claim 8 and comprising about 80% of the resilient, open-celled neoprene, about 7.5% of the polystyrene beads and about 12.5% of the binder.

* * * * *